United States Patent
Hillier

(10) Patent No.: US 10,652,385 B2
(45) Date of Patent: May 12, 2020

(54) METHOD AND SYSTEM FOR VIEWING AVAILABLE DEVICES FOR AN ELECTRONIC COMMUNICATION

(71) Applicant: Peter Hillier, Ottawa (CA)

(72) Inventor: Peter Hillier, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 25 days.

(21) Appl. No.: 14/507,630

(22) Filed: Oct. 6, 2014

(65) Prior Publication Data

US 2016/0100043 A1    Apr. 7, 2016

(51) Int. Cl.
*H04W 4/02* (2018.01)
*H04M 1/72* (2006.01)
*H04M 1/725* (2006.01)
*H04W 4/80* (2018.01)

(52) U.S. Cl.
CPC ..... *H04M 1/7253* (2013.01); *H04M 1/72572* (2013.01); *H04W 4/023* (2013.01); *H04W 4/80* (2018.02)

(58) Field of Classification Search
CPC ....... H04W 76/02; H04W 8/26; H04W 88/06; H04W 8/265; H04W 8/005; H04W 4/00; H04W 4/02; H04W 8/00; H04W 4/008; H04W 4/023; H04M 2207/18; H04M 3/42178; H04M 1/72; H04M 1/7253; H04M 1/72572
USPC ............... 455/426.1, 445, 41.2, 419, 420, 455/456.1–456.6
See application file for complete search history.

(56) References Cited

U.S. PATENT DOCUMENTS

| | | | |
|---|---|---|---|
| 10,042,595 B2* | 8/2018 | Behzadi | G06F 3/0484 |
| 2005/0038876 A1* | 2/2005 | Chaudhuri | G06Q 10/10 709/219 |
| 2006/0135218 A1* | 6/2006 | Son | H04B 1/3877 455/573 |
| 2008/0184803 A1* | 8/2008 | Seagrave | H04R 3/005 73/649 |
| 2009/0157512 A1* | 6/2009 | King | G06Q 10/10 705/14.27 |
| 2009/0318082 A1* | 12/2009 | Sinton | H04W 48/18 455/41.2 |
| 2011/0217960 A1* | 9/2011 | Tanaka | H04B 1/692 455/414.1 |
| 2013/0136089 A1* | 5/2013 | Gillett | H04W 72/048 370/329 |
| 2013/0225077 A1* | 8/2013 | Schultz | H02J 7/025 455/41.1 |
| 2014/0051360 A1* | 2/2014 | Kim | H04W 4/08 455/41.2 |
| 2014/0068469 A1* | 3/2014 | Lee | H04M 1/7253 715/761 |
| 2014/0141718 A1* | 5/2014 | Stromberg | G06Q 20/32 455/41.1 |
| 2014/0173447 A1* | 6/2014 | Das | G06F 3/04842 715/738 |
| 2014/0223177 A1* | 8/2014 | Dempster | G06F 21/606 713/165 |

(Continued)

*Primary Examiner* — Khawar Iqbal

(57) ABSTRACT

Systems and methods for determining and displaying nearby communication devices are disclosed. The systems and methods allow a user to easily determine nearby communication devices from which or to which a communication can be transferred. In addition, exemplary systems and methods allow a user to easily transfer a communication from a first device to a second device.

16 Claims, 6 Drawing Sheets

(56) References Cited

U.S. PATENT DOCUMENTS

| | | | |
|---|---|---|---|
| 2014/0235248 A1* | 8/2014 | Chai | H04W 36/0083 455/436 |
| 2014/0247346 A1* | 9/2014 | Bozarth | H04N 7/18 348/143 |
| 2014/0273859 A1* | 9/2014 | Luna | H04W 4/023 455/41.3 |
| 2014/0275850 A1* | 9/2014 | Venkatraman | A61B 5/0002 600/301 |
| 2014/0365513 A1* | 12/2014 | Aftab | G06F 17/30867 707/754 |
| 2014/0368336 A1* | 12/2014 | Felix | H04W 4/008 340/539.13 |
| 2015/0009862 A1* | 1/2015 | Zhang | H04B 5/0031 370/254 |
| 2015/0116760 A1* | 4/2015 | Kim | H04N 1/00503 358/1.15 |
| 2015/0134428 A1* | 5/2015 | Li | G06Q 20/327 705/13 |
| 2015/0163302 A1* | 6/2015 | Armstrong | H04L 67/06 709/217 |
| 2015/0312113 A1* | 10/2015 | Forutanpour | H04W 4/70 715/734 |
| 2016/0029182 A1* | 1/2016 | Leppanen | H04W 4/023 455/416 |
| 2016/0063097 A1* | 3/2016 | Brown | G06K 9/6254 707/737 |
| 2016/0179295 A1* | 6/2016 | Liang | H04W 76/10 715/740 |
| 2016/0192166 A1* | 6/2016 | deCharms | H04W 4/021 348/14.02 |
| 2016/0242032 A1* | 8/2016 | De Kievit | H04L 9/088 |
| 2016/0316243 A1* | 10/2016 | Park | H04N 21/2343 |
| 2017/0134609 A1* | 5/2017 | Park | H04N 1/00278 |
| 2017/0339215 A1* | 11/2017 | Chan | H04L 67/06 |

\* cited by examiner

METHOD AND SYSTEM FOR VIEWING AVAILABLE DEVICES FOR AN ELECTRONIC COMMUNICATION

FIELD OF THE INVENTION

The present disclosure generally relates to electronic communication systems and methods. More particularly, the disclosure relates to electronic communication methods and systems for viewing nearby devices suitable for communication transfer and to methods and systems for transferring communications between a first device and a second, nearby device.

BACKGROUND OF THE INVENTION

Communication devices, such as voice and/or video communication devices (e.g., phones, mobile phones, computers, tablets, etc.) have a range of capabilities and can be used for a variety of forms of communication. For example, communication devices can be used for voice only communication, audio and visual communication, collaborative communication, and the like.

For various reasons, it may be desirable to transfer a communication (e.g., a phone call or a video call) from one communication device to another. For example, it may be desirable to transfer a call from a mobile device to a desk-top or stationary device or vice versa for better (e.g., allow for video in addition to voice communication or allow collaboration in addition to voice and/or video communication, better audio quality, better video quality, and/or better connection to a network), more convenient (e.g., larger screen, easier to use, more battery power or does not rely on battery power), and/or more secure communication (e.g., may be hardwired to a network rather than use wireless communication).

In addition, users often own or have access to one or more personal communication devices (e.g., phones, computers, mobile phones, tablets, and the like) as well as common communication devices, such as conference devices, collaboration devices, and the like. A user may desire to transfer a communication to or from a personal or common device to another device based on one or more criteria, such as the device capabilities noted above, or for another convenience.

Techniques for transferring a communication from a first device to a second device generally require that a user know the existence of the second device and that the first and second devices be on the same network. In addition, a user must generally know information about the second device, such as an extension, phone number, or the like, and enter that information onto his or her first device. Additionally or alternatively, the first and second devices can be preconfigured in a ring group or other formal structure that allows communications to be transferred between devices. For example, private branch exchange (PBX) networks can include ring groups or personal ring groups that allow call parking and pickup to transfer communications between devices. Such communication transfer techniques rely on static programming, and thus are not adaptive to a user's surroundings.

Unfortunately, users often do not know of the existence of or location of devices—e.g., nearby devices—to which or from which they could transfer or receive communications. For example, when traveling, a user in a hotel, or a cruise ship, at a conference center, or the like would likely not know of nearby communication devices suitable for transferring an electronic communication. Further, users typically don't know the capabilities (e.g., video, collaboration) of nearby common devices, and/or the condition (e.g., working, powered, or the like) of the nearby common devices. And, even if such devices were known to a user, typical communication transfer techniques require an exchange of credentials, which the user may not know or which may be cumbersome to enter.

Accordingly, improved methods and systems for quickly and easily identifying nearby communication devices, displaying the nearby communication devices' capabilities, and optionally transferring a communication to or from nearby communication devices are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The disclosure describes exemplary communication systems and methods. As set forth in more detail below, exemplary systems and methods described herein may be used for a variety of applications, including data, text, voice, video, and collaborative communications. Exemplary systems and methods detect (e.g., dynamically) nearby communication devices and display detected nearby communication devices on a user's device; the displayed nearby devices can include only those to which a user has permission to use, such as personal devices and common devices that the user has permission to use. The systems and methods can also display indicia of the nearby communication devices' capabilities (e.g., text, video, audio, or collaborative) and status (e.g., powered or not) in a manner that is easily discernable by a user. The systems and methods can also allow for easy transfer of a communication between a user's device and one or more of the detected nearby communication devices.

Figure 1:
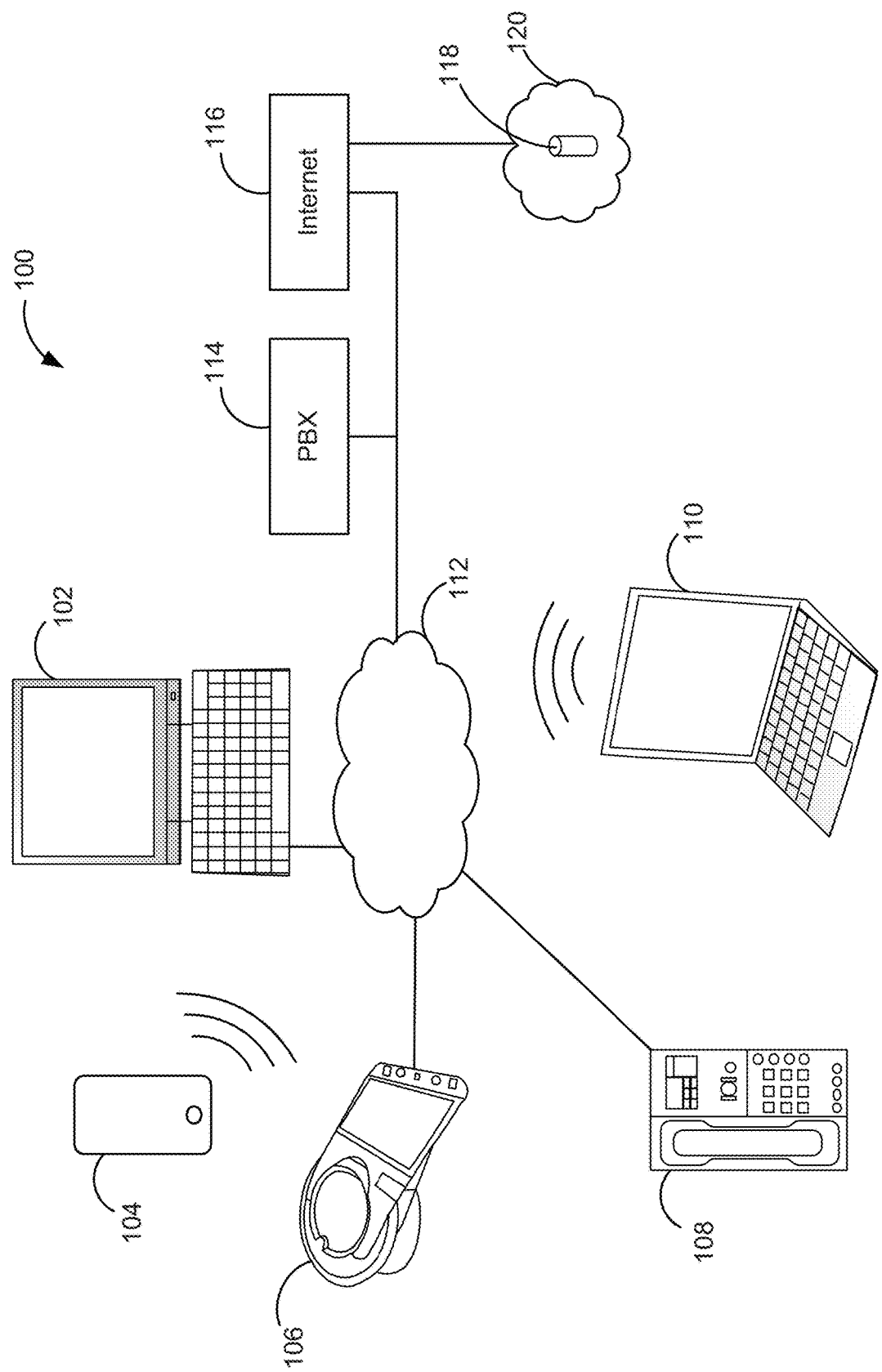
FIG. 1 illustrates a system in accordance with exemplary embodiments of the disclosure.

FIG. 1 illustrates a system 100 in accordance with exemplary embodiments of the disclosure. System 100 includes one or more communication devices, such as devices 102-110. As illustrated, communication devices 102-110 (also referred to herein as devices) can connect to a local area network 112, which in turn, can be coupled to one or more other networks, such as a private branch exchange 114, and/or the Internet 116. Devices 102-110 can be connected to network 112 using wireless and/or wired technologies. System 100 can optionally include a database 118, which can form part of another network 120 or alternatively, form part of network 112 or another network.

Communication devices 102-110 can include any suitable devices, wherein at least one of the communication devices includes an application as described herein. For example, communication devices 102-110 can include a desktop computer (102), a smart phone (104), a collaboration device (106), a desktop phone (108), a laptop or table computer (110), or any other communication device. As set forth in more detail below, one or more of the of the communication devices 102-110 can also include global positioning system (GPS) devices, wireless communication devices (e.g., WiFi, Bluetooth, Bluetooth low energy), or the like. Communication devices 102-110 can also include information relating to a device's capabilities and/or status, such that the information (capabilities and/or status) can be transmitted to a user's device.

Exemplary systems include a first communication device and a second communication device. First and second communication devices can be any of communication devices 102-110 or other suitable communication device.

Network 112 and/or network 120 can include or be a local area network (LAN), a wide area network, a personal area network, a campus area network, a metropolitan area network, a global area network, or the like. Network 112 and/or 120 can be coupled to other networks, such as a private branch exchange (PBX) 114 network, to other devices typically coupled to a network, and/or to Internet 116.

Database 118 can include any suitable database. In accordance with some exemplary embodiments, database 118 stores device location and device capabilities. In accordance with some examples of these embodiments, database 118 also stores status information (e.g., on, off, low battery, in use, and the like) information.

As noted above, one or more first communication devices 102-110 are configured to detect one or more second, nearby devices and to display the nearby (e.g., available) devices. In accordance with various embodiments of the disclosure, one or more first devices use one or more wireless technologies to determine available nearby second communication devices and to receive information (e.g., device capabilities, current communication capabilities, status, extension number, direct inward dialing number (DID), and the like) from the second, nearby communication device. Exemplary wireless technologies include WiFi, Bluetooth, and Bluetooth low energy. By way of examples, a first communication device uses Bluetooth, Bluetooth low energy, or similar technology to send a notification, e.g., signal, ping, etc., to determine whether one or more second devices are nearby. "Nearby" can be defined as within a communication transfer range between a first device and a second device. Exemplary transfer ranges include up to 100 m, up to 50 m, up to 15 m, or up to 10 m. In accordance with various aspects of these examples, a device (e.g., a first device) is configured to recognize devices within a predefined range, which can be the same as or less than the communication transfer range. A distance between the first and second device can be determined based on a signal strength received by the first communication device from the second communication device and/or a signal received by the second communication device from the first communication device.

If a second, nearby device receives the signal (ping), the second, nearby device can send information back to the first communication device, indicating the capabilities and optionally the status of the second device.

In accordance with further aspects of the exemplary embodiments, one or more of the first and second devices can request security credentials (e.g., a password or the like) prior to allowing transfer of a communication. Additionally or alternatively, before allowing transfer of a call, one or more of the first or second devices can query the other device to determine, using the application, if the other device has requisite permission and/or licensing to continue the communication.

In accordance with alternative embodiments of the disclosure, a first device can query a database (e.g., database 118) to determine nearby communication devices (e.g., based on location coordinates (e.g., GPS)) of the first device and the second device, the corresponding device capabilities, and optionally status of the device(s)). The first device (e.g., a client) retrieves the information and an application on the first device causes information (e.g., available devices, indicia of capabilities, and optionally status) to be displayed on a display of the first device.

As noted above, in accordance with various embodiments of the disclosure, one or more devices 102-110 includes an application as described herein. Exemplary applications determine whether a device match has been met and provide a user interface and cause to be displayed on nearby devices from which or to which a communication can be transferred. In accordance with various aspects of these embodiments, the application caused to be displayed icon(s) or word(s) to indicate capabilities of another device. Examples employ only one user interface screen for the display of available devices and for transfer of communications between devices. In addition, the application can provide further indicia to indicate whether the other device('s/s') capabilities are the same, the same or better, better, the same or less, or less than the first device's capabilities or the capabilities employed for a particular communication. For example, a color of the icon representing a device's capabilities or a color surrounding or proximate the icon can be used to indicate whether the nearby device(s) (has/have) the same, the same or better, better, the same or less, or less than the first device's capabilities (or capabilities employed on a particular communication), with a different color associated with each different level of capability. By way of particular examples, green can be used to indicate that a nearby device has the same, better, or the same or better capabilities; yellow can be used to indicate devices that have the same, lesser, or the same or lesser capabilities, and red can be used to indicate devices that a user may not desire to connect to—e.g., based on a status, such as low battery or in use.

Figure 2:
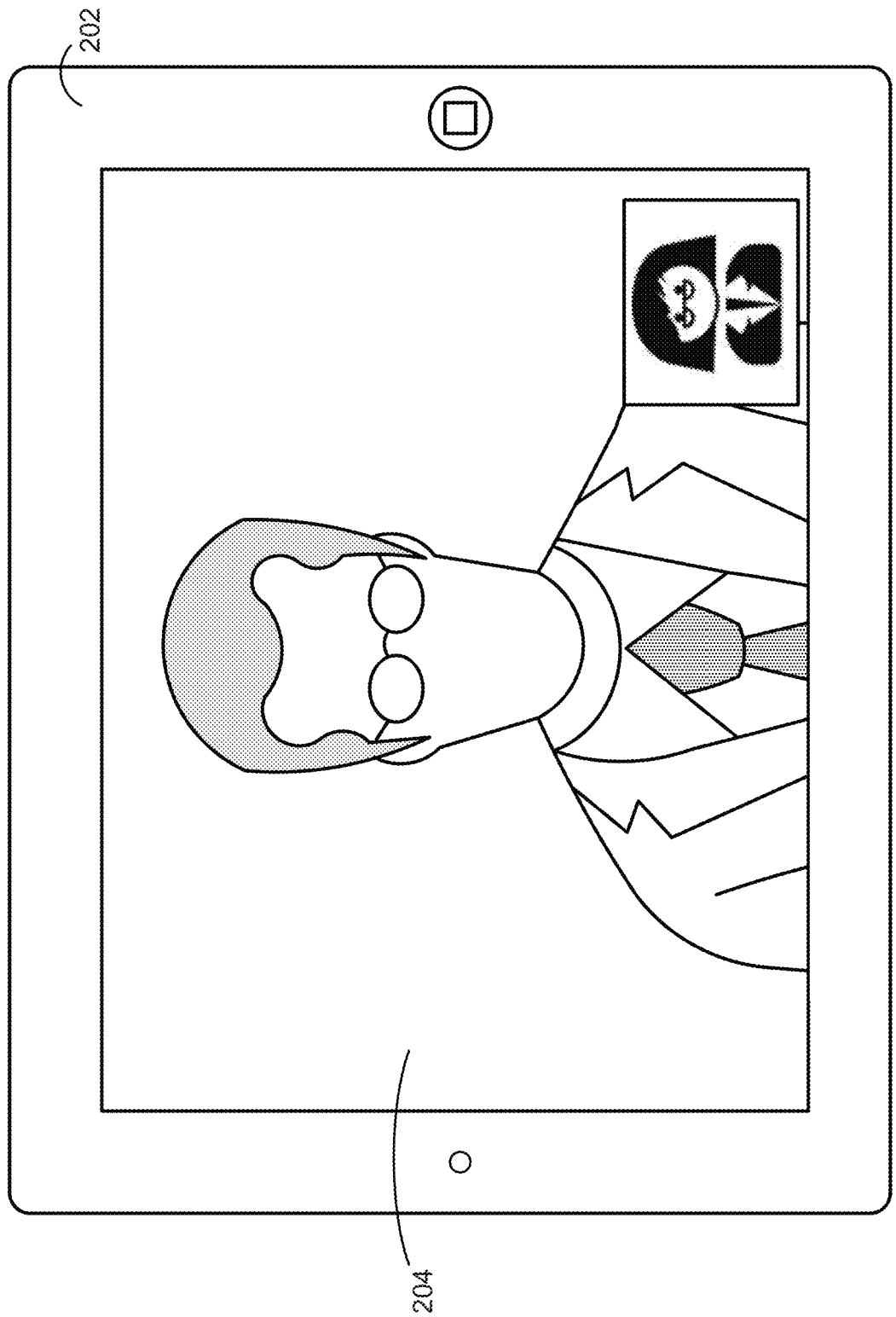
FIG. 2 illustrates a video conference in accordance with further exemplary embodiments of the disclosure.
Figure 3:
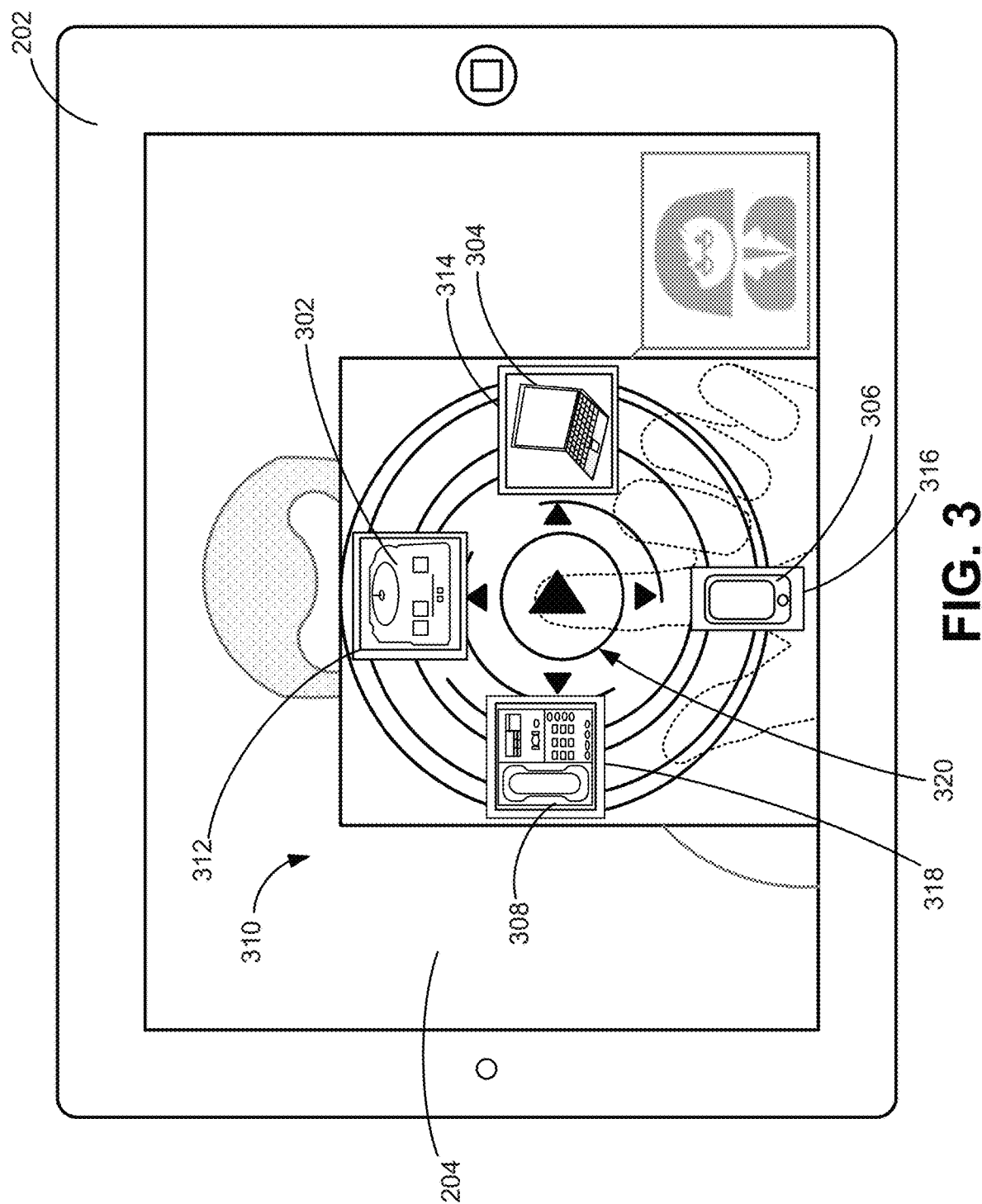
FIG. 3 illustrates use of an application, illustrating a display of nearby communication devices in accordance with yet further exemplary embodiments of the disclosure.

FIGS. 2-6 illustrate use of exemplary methods and systems of the present disclosure. FIG. 2 illustrates a video communication between a first user and a second user using a device 202. Device 202 can be the same or similar to any device 102-110, and is conveniently illustrated as a tablet. During a communication (e.g., a video communication in the illustrated example), a user can use a user interface of an application (which can be part of the communication application or a stand-alone application) to cause device 202 to query whether there are any suitable nearby devices. For example, a user can touch the screen, as illustrated in FIG. 3, to cause the application to query and display nearby devices. As noted above, the query can either be direct, between device 202 and any nearby devices and/or device 202 can query a database, such as database 118. Alternatively, the application can automatically query whether there are any nearby devices. For example, the application can be part of a communication application that automatically runs in the background of the communication application or stand-alone application. In this case, the application can automatically alert—e.g., with a sound or a vibration—to notify a user that a communication device, to which or from which a communication can be transferred, is nearby.

In the example illustrated in FIG. 3, once device 202 has determined the nearby communication devices (either manually or automatically), icons 302-308, which can represent the respective devices' capabilities, are displayed. Icons 302-308 can radiate outwardly to indicate a distance of the represented device from a user. The display can be an overlay on the communication, as shown, and the background can be "misty" to indicate that the communication is in the background, but is not on hold, allowing the communication to continue. Further, an overlay user interface 310, with icons 302-308 as well as indications of available actions can be transparent, to facilitate continuance of the communication.

In the illustrated example, four nearby communication devices 302-308 have been discovered by device 202: a collaboration device (302), a laptop (304), a mobile device (306), and a desktop phone (308). Further, icons 302-308 can have a color area (indications 312-318) to indicate a status of each device. For example, icons 302, 304, 308 can include green or yellow color areas 312, 314, 318 to indicate the devices are available, and device 306 can include a red color area 316 to indicate the device is not available (e.g., on another communication or low or out of power). The green color can indicate that the icon is associated with a device having the same or the same or better or better capabilities and yellow can indicate lesser capabilities.

To transfer a communication from device 202 (a first device) to another device (a second device), a user can swipe a finger across a screen 204 from, for example, an area 320 toward an icon representing the second device. Or, a user can use other gestures, such as tilting or moving device 202, to transfer a communication.

Figure 4:
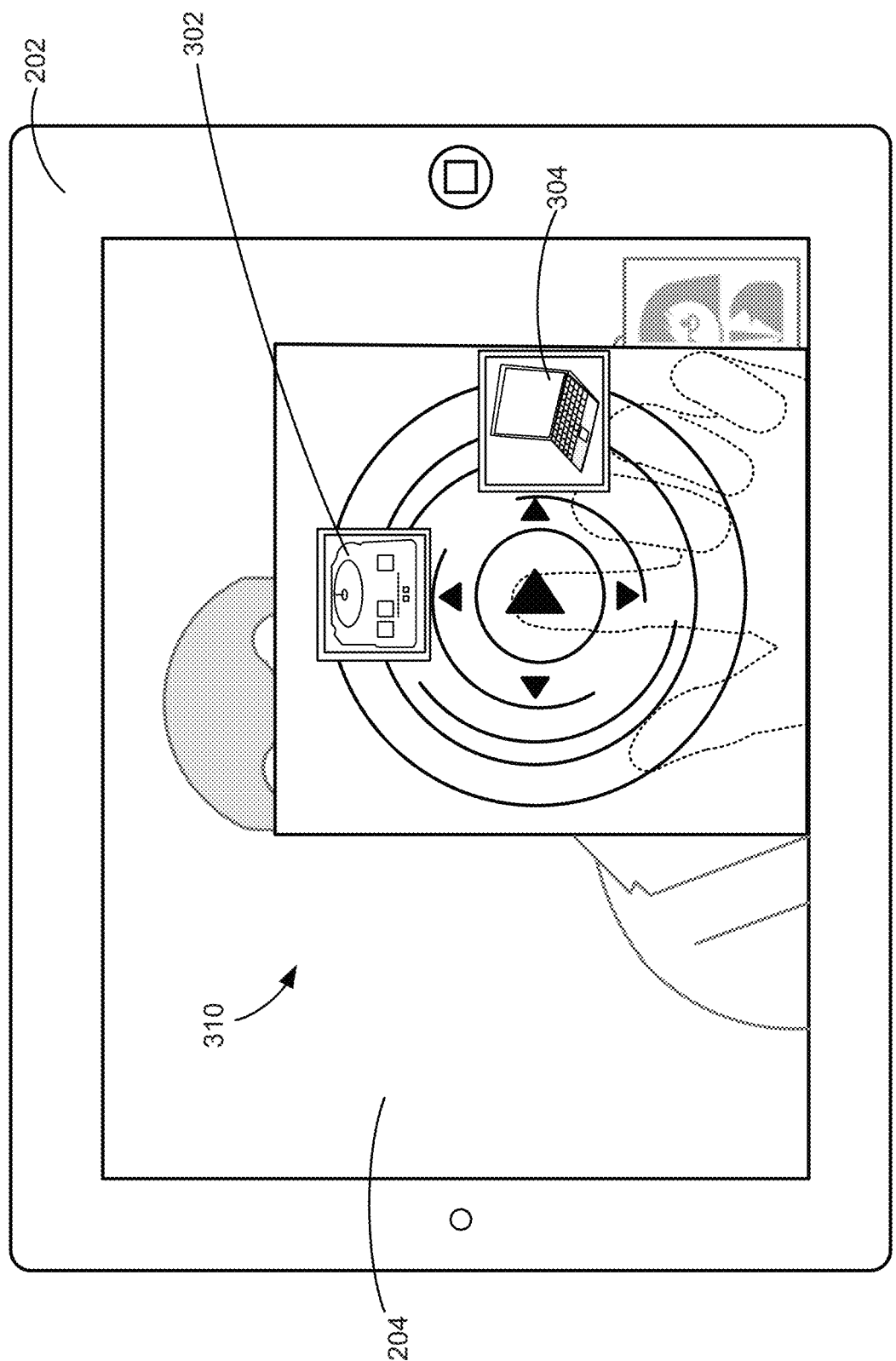
FIG. 4 illustrates use of an application, illustrating a display of nearby devices having the same or greater capabilities than a user's communication device in accordance with additional exemplary embodiments of the disclosure.
Figure 5:
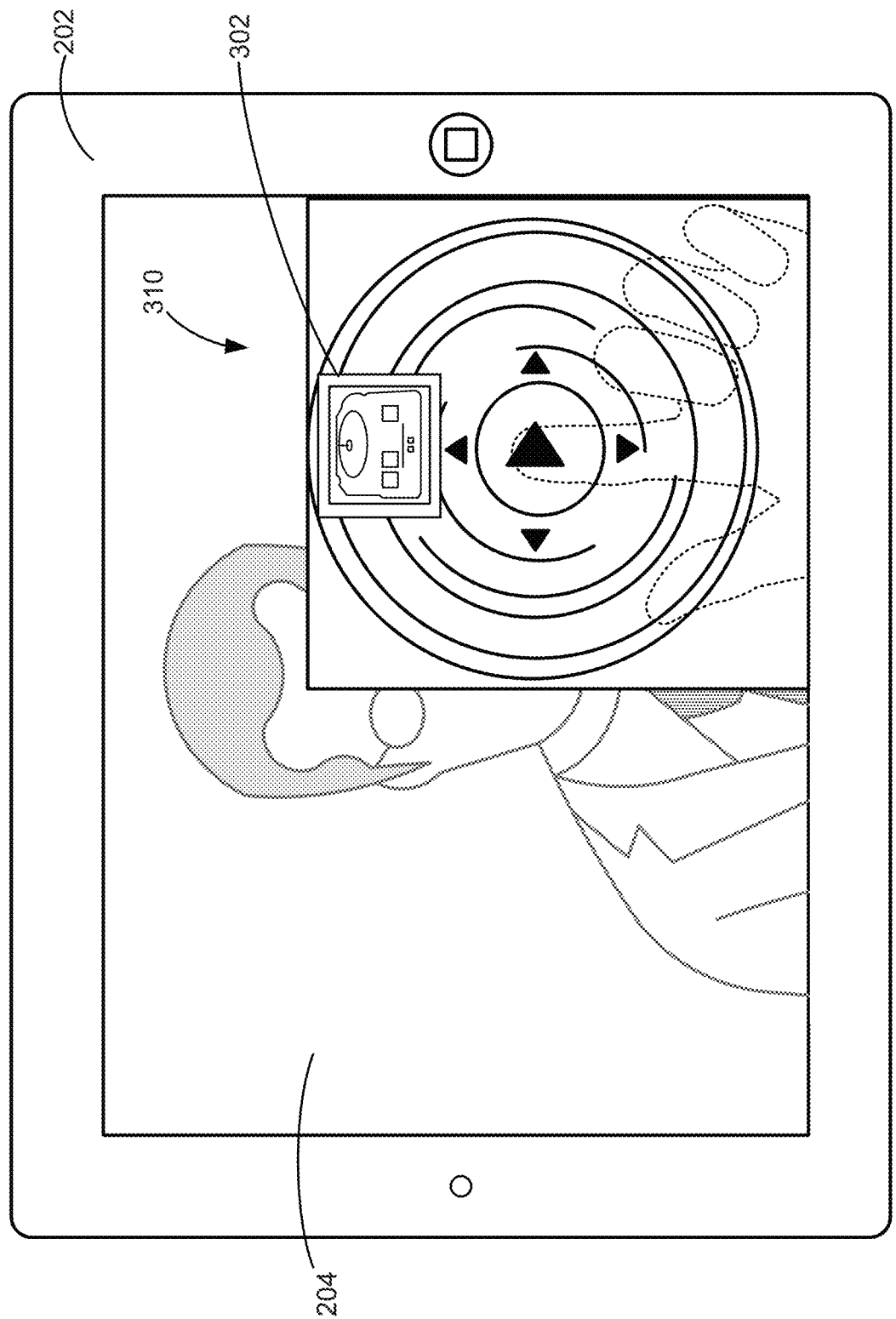
FIG. 5 illustrates use of an application, illustrating a display of nearby devices having greater capabilities than a user's communication device in accordance with additional exemplary embodiments of the disclosure.
Figure 6:
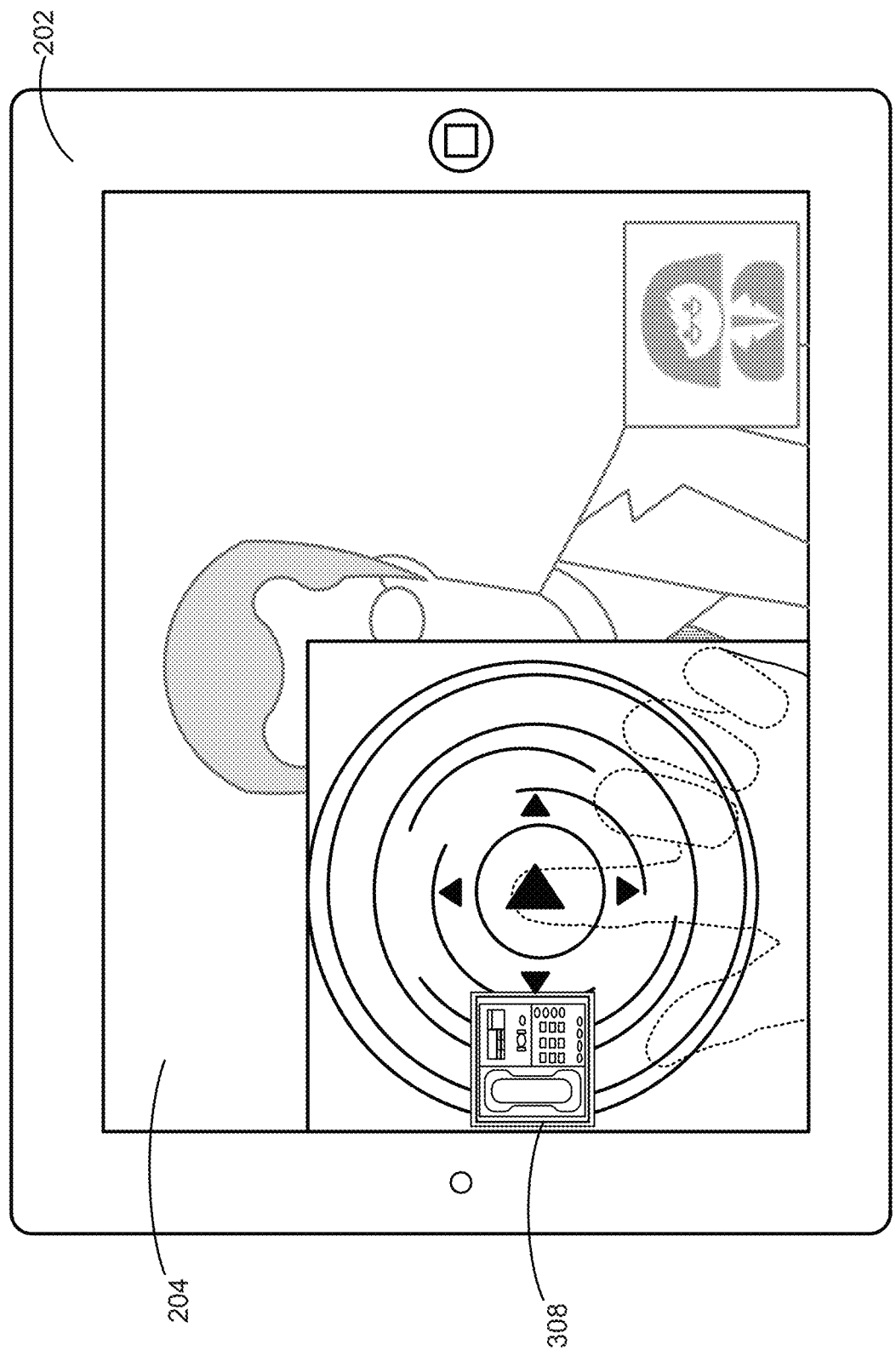
FIG. 6 illustrates use of an application, illustrating a display of nearby devices having lesser capabilities than a user's communication device in accordance with additional exemplary embodiments of the disclosure.

In accordance with further exemplary embodiments of the disclosure, a user can refine search results of nearby communication devices. For example, as illustrated in FIGS. 4-6, a user can use multiple fingers or a prolonged swipe to move overlay 310 up, down, left, or right. In the example illustrated in FIG. 4, a gesture (moving overlay 310 up) narrows the search results to indicate devices with the same (304) or greater (302) capabilities. Similarly, as illustrated in FIG. 5, another gesture (moving overlay 310 to the right) can cause device 202 to display icons of devices with greater communication capabilities (e.g., icon 302, corresponding to a collaboration device). And, as illustrated in FIG. 6, another gesture (sliding overlay 310 to the left) causes device 202 to display icons corresponding to nearby devices with lesser capabilities.

If a search has been refined, after the search results have been refined, a user can use the user interface to select a desired device to move the communication to or from. Or, a user can continue the communication of device 202. By way of example, if a user desires to retain the communication on device 202, the user can remove a finger from overlay 310, touch an area of screen 204 away from overlay 310, or use another suitable gesture. The communication then comes to the foreground—e.g., the video or other communication is no longer misty.

Although generally described above in connection with transferring a communication from a user's device to another (second) device, as noted herein, the methods and systems can be used to pull communications from another device of which the user has permission to use. In this case, the gesture can include swiping from the icon (e.g., icon 302) on a display toward area 320. Multiple push/pull sequences can be employed on a single communication.

As noted above, various exemplary systems and methods can be configured to manually search for nearby devices or to automatically search for nearby devices. In either mode, a predetermined distance range can be entered by a user or set as a default. In the case of a manual search, a gesture, such as holding a finger in contact with a screen, can be used to set a distance range. In this case, for example, the longer a user holds a finger in contact with the screen (or performs another gesture), the further the distance range that will be used in a search for nearby devices. Additionally or alternatively, types of devices to be displayed by the application can be preselected—e.g., only display video, audio, and/or collaborative (in any combination), only display devices with better or the same or better capabilities, and the like. Also, only devices that are available—e.g., have more than ten percent battery power and/or that are not on another call can be selected to display.

When not on a call, the application (whether part of a communication application—e.g., VoIP—, or a stand-alone application), can receive and interpret a gesture (such as touching the screen for a period of time) and cause device 202 to search for nearby communication devices and to display the nearby devices. In the case of pulling a communication, the application can display one or more devices having an active call that a user has permission to transfer from and to the user's device (e.g., device 202). The communication to be transferred can be on another of the user's devices or can be from a common device, such as a phone or conference unit. In this case, the icons and status indicators can be used to indicate whether capabilities will be the same, greater, and/or lesser to the capabilities employed for the communication. For example, if a user pulls a non-collaborative audio or video communication from a collaboration device to a smart mobile device, the icon could represent the collaboration device, and the indicium could be a green color proximate the icon, since the mobile device can handle audio and video communication. However, if the user wanted to pull a collaborative communication, the indicium could be red, indicating a lack of ability of the smart mobile device to handle such communications.

In accordance with alternative examples, callerID or other information related to a communication (e.g., voice recognition, voice stream analysis, contextual speech recognition), can be used to list possible devices to which a communication can be transferred, and the user can then transfer a communication to another individual. This transfer to other users can be dynamic—such as on a shift change or where other fluid movement of workers takes place. For example, calls can be transferred to a device of the closest user (e.g., a nurse closest to a patient).

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

I claim:

1. A communication system comprising:
    a first communication device comprising an application, wherein the first communication device uses one or more wireless technologies to determine whether one or more other compatible devices are within a communication transfer range by sending a signal between the first communication device and one or more other communication devices, wherein, in response to signal between the first communication device and the one or more other communication devices, the one or more other communication devices send information, indicating device capabilities, to the first communication device and the application determines whether a match between the first communication device and the one or more other compatible devices is met, wherein any matched devices correspond to one or more of nearby communication devices to which a communication can be transferred, and the application causes to be displayed on the first communication device one or more of the nearby communication devices from the one or more other communication devices within the communication transfer range and one or more indicia of capabilities, comprising one or more of video, audio, and collaborative communication, of the one or more of the nearby communication devices, wherein the application provides further indicia that indicate whether the nearby communication device's capabilities are the same, the same or better, better, the same or less, or less than the first communication device's capabilities and wherein a communication, comprising one or more of a phone call, a video call and a collaboration communication, between the first communication device and another communication device is transferred between the first communication device and a second communication device using the application;
    wherein the indicia further comprise colors corresponding to a power level of a communication device.

2. The communication system of claim 1, wherein the indicia comprise an icon associated with one or more of the nearby communication devices that are within a communication transfer range.

3. The communication system of claim 1, wherein the indicia comprise a color corresponding to a level of device compatibility.

4. The communication system of claim 1, wherein the indicia indicate whether the one or more of the nearby communication devices comprises the same capabilities or different capabilities.

5. The communication system of claim 1, wherein a first gesture causes the application to display the nearby communication devices with the same and lesser or lesser capabilities than the first communication device and a second gesture causes the application to display the nearby communication devices with the same and greater or greater capabilities than the first communication device.

6. The communication system of claim 1, wherein a user uses a gesture to cause the application to transfer the communication from the first communication device to the second communication device.

7. The communication system of claim 1, wherein a user uses a gesture to cause the application to transfer the communication from the second communication device to the first communication device.

8. The communication system of claim 1, wherein the signal comprises a ping and one or more of the nearby communication devices respond to the ping with information including communication device capabilities.

9. The communication system of claim 1, wherein the one or more of the nearby communication devices comprise a second communication device that employs credential verification prior to allowing a communication transfer.

10. The communication system of claim 1, wherein whether a communication device is a nearby communication device is determined based on a signal strength, wherein the signal is selected from the group consisting of WiFi, Bluetooth, and Bluetooth low energy.

11. The communication system of claim 1, wherein whether a communication device is a nearby communication device is determined based on GPS coordinates of one or more communication devices.

12. An electronic communication method, the method comprising the steps of:
    providing a first communication device having an application thereon; using the application, determining whether a device match is met between the first communication device and one or more other communication device, wherein any matched devices correspond to nearby communication devices; using the first communication device, determining whether one or more of the nearby communication devices are within a communication transfer range, said transfer range being up to 100 meters; determining, by requesting security credentials, whether a user has permission to use the one or more of the nearby communication devices that are within the communication transfer range; using the application, displaying on the first communication device one or more of the nearby communication devices within the communication transfer range and corresponding indicia of capabilities comprising one or more of video, audio, and collaborative communication for each of the nearby communication devices, said indicia based on information directly received from the second device by the first communication device in response to a signal received from the first communication device, wherein the application provides further indicia that indicate whether the nearby communication device's capabilities are the same, the same or better, better, the same or less, or less than the first communication device's capabilities; and
    after an exchange of the security credentials, using the application, transferring a communication between the first communication device and another communication device to or from a second communication device, wherein the communication comprises one or more of a video call, a voice call, and a collaboration communication;

wherein the indicia further comprise colors corresponding to a power level of a communication device.

13. The method of claim 12, further comprising a step of performing a gesture to determine the nearby communication devices with the same and greater or greater capabilities.

14. The method of claim 12, further comprising a step of performing a gesture to determine the nearby communication devices with the same and lesser or lesser capabilities.

15. The method of claim 12, further comprising a step of performing a gesture to transfer a communication between the first communication device and one of the nearby communication devices.

16. An electronic communication method, the method comprising the steps of:

providing a first communication device having an application thereon;

using the first communication device, determining whether one or more nearby communication devices are within a communication transfer range, wherein the step of determining comprises one or more of pinging one or more nearby communication devices and determining a signal strength from one or more nearby communication devices; receiving from the one or more nearby communication devices by the first communication device, in response to the pinging, information indicating the capabilities of the one or more nearby communication devices;

displaying on the first communication device the one or more nearby communication devices and the indicia of the capabilities comprising one or more of video, audio, and collaborative communication and indicia that indicate whether the nearby communication device's capabilities are the same, the same or better, better, the same or less, or less than the first communication device's capabilities; and using the application, transferring a communication, comprising one or more of a voice call, a video call, and a collaboration communication, between the first communication device and another communication device to or from a second communication device;

wherein the indicia further comprises colors corresponding to a power level of a communication device.

* * * * *